US009942300B2

(12) United States Patent
Nigam et al.

(10) Patent No.: US 9,942,300 B2
(45) Date of Patent: *Apr. 10, 2018

(54) DYNAMIC HELP PAGES USING LINKED DATA

(71) Applicant: International Business Machines Corporation, Armonk, NY (US)

(72) Inventors: Gaurav Nigam, Kanpur (IN); Arun Ramakrishnan, Chennai (IN); Rohit Shetty, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 111 days.

This patent is subject to a terminal disclaimer.

(21) Appl. No.: 14/478,782

(22) Filed: Sep. 5, 2014

(65) Prior Publication Data

US 2015/0074229 A1 Mar. 12, 2015

Related U.S. Application Data

(63) Continuation of application No. 14/022,743, filed on Sep. 10, 2013.

(51) Int. Cl.
*H04L 29/08* (2006.01)
*G06F 17/30* (2006.01)
(Continued)

(52) U.S. Cl.
CPC ........ *H04L 67/02* (2013.01); *G06F 17/30893* (2013.01); *G06F 9/4446* (2013.01); *G06F 9/44505* (2013.01); *G06F 17/30864* (2013.01)

(58) Field of Classification Search
CPC . H04L 67/02; G06F 9/4446; G06F 17/30893; G06F 17/30; G06F 17/308
See application file for complete search history.

(56) References Cited

U.S. PATENT DOCUMENTS 6,694,314 B1 * 2/2004 Sullivan ............ G06F 17/30985
7,890,864 B2 * 2/2011 Bartek et al. ................. 715/714
(Continued)

FOREIGN PATENT DOCUMENTS

WO           9735253 A1      9/1997
WO     WO20120167149      * 12/2012

OTHER PUBLICATIONS

Dynamically generate "help page" using search engine results—Google Patent Search.*

(Continued)

*Primary Examiner* — Patrice L Winder
*Assistant Examiner* — Ruth Solomon
(74) *Attorney, Agent, or Firm* — David B. Woycechowsky; Nicholas L. Cadmus

(57) ABSTRACT

Help page techniques including: (i) sending, by a customer computer, heterogeneous software context data to a central registry over a communication network; (ii) receiving, by the customer computer, from a registry server over the communication network, a set of network address information including at least a first network address information for contacting a first provider server relating to the first software product and a second network address information for contacting a second provider server relating to the second software product; and (iii) linking, by the customer computer, the first and second network address information on a single set of help page(s).

3 Claims, 4 Drawing Sheets

(51) Int. Cl.
*G06F 9/44* (2006.01)
*G06F 9/445* (2006.01)

(56) References Cited

U.S. PATENT DOCUMENTS

| | | | | |
|---|---|---|---|---|
| 8,140,507 | B2* | 3/2012 | Hasson | G06F 17/30864 707/706 |
| 8,352,473 | B2* | 1/2013 | Fuxman | G06Q 30/0281 705/343 |
| 8,930,370 | B2* | 1/2015 | Musgrove | G06F 17/30864 707/740 |
| 2002/0010724 | A1 | 1/2002 | Sterling et al. | |
| 2006/0117315 | A1 | 6/2006 | Bussert et al. | |
| 2006/0129931 | A1* | 6/2006 | Simons | G06F 9/4446 715/705 |
| 2006/0136409 | A1* | 6/2006 | Leidig | G06F 9/4446 |
| 2007/0074164 | A1* | 3/2007 | Stienhans | G06F 8/71 717/120 |
| 2008/0201705 | A1* | 8/2008 | Wookey | G06F 8/68 717/175 |
| 2009/0012950 | A1* | 1/2009 | Hasson | G06F 17/30864 |
| 2009/0198764 | A1* | 8/2009 | Pham | G06Q 10/06 709/202 |
| 2010/0293461 | A1* | 11/2010 | Boezeman | G06F 17/30861 715/708 |
| 2011/0131564 | A1* | 6/2011 | Vidal | G06F 8/65 717/174 |
| 2011/0246880 | A1 | 10/2011 | Horton et al. | |
| 2011/0264598 | A1* | 10/2011 | Fuxman | G06Q 30/0281 705/343 |
| 2011/0307780 | A1* | 12/2011 | Harris | G06F 9/4446 715/708 |
| 2012/0191719 | A1* | 7/2012 | Musgrove | G06Q 30/06 707/740 |
| 2012/0310914 | A1* | 12/2012 | Khan | G06F 17/30864 707/710 |
| 2013/0024790 | A1 | 1/2013 | Agsteiner | |
| 2013/0047148 | A1* | 2/2013 | Lui | G06F 8/65 717/173 |
| 2013/0090962 | A1 | 4/2013 | Dotan et al. | |
| 2013/0238663 | A1* | 9/2013 | Mead | G06F 17/3087 707/792 |
| 2013/0254757 | A1* | 9/2013 | Yousouf | G06F 8/61 717/174 |
| 2013/0311905 | A1* | 11/2013 | Czyzewicz et al. | 715/753 |
| 2014/0108621 | A1* | 4/2014 | Bryan et al. | 709/219 |
| 2014/0149243 | A1* | 5/2014 | Jansen | G06Q 30/0601 705/26.1 |
| 2014/0181652 | A1* | 6/2014 | Stanke | G06F 9/4446 715/708 |
| 2015/0355959 | A1* | 12/2015 | Kogan-Katz | G06F 11/0772 714/57 |

OTHER PUBLICATIONS

Integrating different software providers—Google Patent Search—Sep. 29, 2017.*
Earle, Ralph, "Deployment wiki external linking guidelines", Jun. 24, 2013, <https://jazz.net/wiki/bin/view/Deployment/DeploymentExternalLinkingPolicy>.
"About the ARM Infocenter", Copyright 2007-2010 ARM limited, <http://infocenter.arm.com/help/topic/com.arm.doc.home/index.html>.
"Information and Support for Configuration Manager", Updated Jan. 1, 2013, Copyright 2013 Microsoft, <http://technet.microsoft.com/en-us/library/gg682085.aspx>.
U.S. Appl. No. 14/022,743, entitled "Dynamic Help Pages Using Linked Data", filed Sep. 10, 2013.

* cited by examiner

DYNAMIC HELP PAGES USING LINKED DATA

FIELD OF THE INVENTION

The present invention relates generally to the field of computer network communications, and more particularly to computer network communications relating to user "help" issues.

BACKGROUND OF THE INVENTION

As a preliminary note, when software "help" and software "documentation" and software "problems" are mentioned herein, this document is referring to end user help, documentation and problems, as opposed to, say, software designer help, documentation and problems. The end user may be an IT person (information technology specialist), or the end user may be a person without much training or education in the field of computer software. In this document, the various types of end users are sometimes collectively referred to as "customers."

Help pages are generally defined as topic-oriented, procedural or reference information delivered through computer software. It is a form of user assistance. Most online help, including help pages, is designed to give assistance in the use of software applications or operating systems, but can also be used to present information on a broad range of topics. Microsoft Compiled HTML Help is a Microsoft proprietary online help format, consisting of a collection of HTML pages, an index and other navigation tools. The files are compressed and deployed in a binary format with the extension .CHM, for Compiled HTML. The format is often used for software documentation. Some conventional help systems help a user for a single/locale environment and link windows in a static manner for predefined dialogues.

SUMMARY

According to an aspect of the present invention, a method includes the following steps (not necessarily in the following order): (i) sending, by a customer computer, heterogeneous software context data to a central registry over a communication network, with: (a) the heterogeneous context data including an identity of at least a first software product by a first software provider and a second software product by a second software provider, and (b) the first and second software products being software that is, or has been, run by the customer on and/or through the customer computer; (ii) receiving, by the customer computer, from a registry server over the communication network, a set of network address information including at least a first network address information for contacting a first provider server relating to the first software product and a second network address information for contacting a second provider server relating to the second software product; and (iii) linking, by the customer computer, the first and second network address information on a single set of help page(s). The first network address information corresponds to information on the first provider server that relates to the first software product. The second network address information corresponds to information on the first provider server that relates to the second software product.

DETAILED DESCRIPTION

Figure 1:
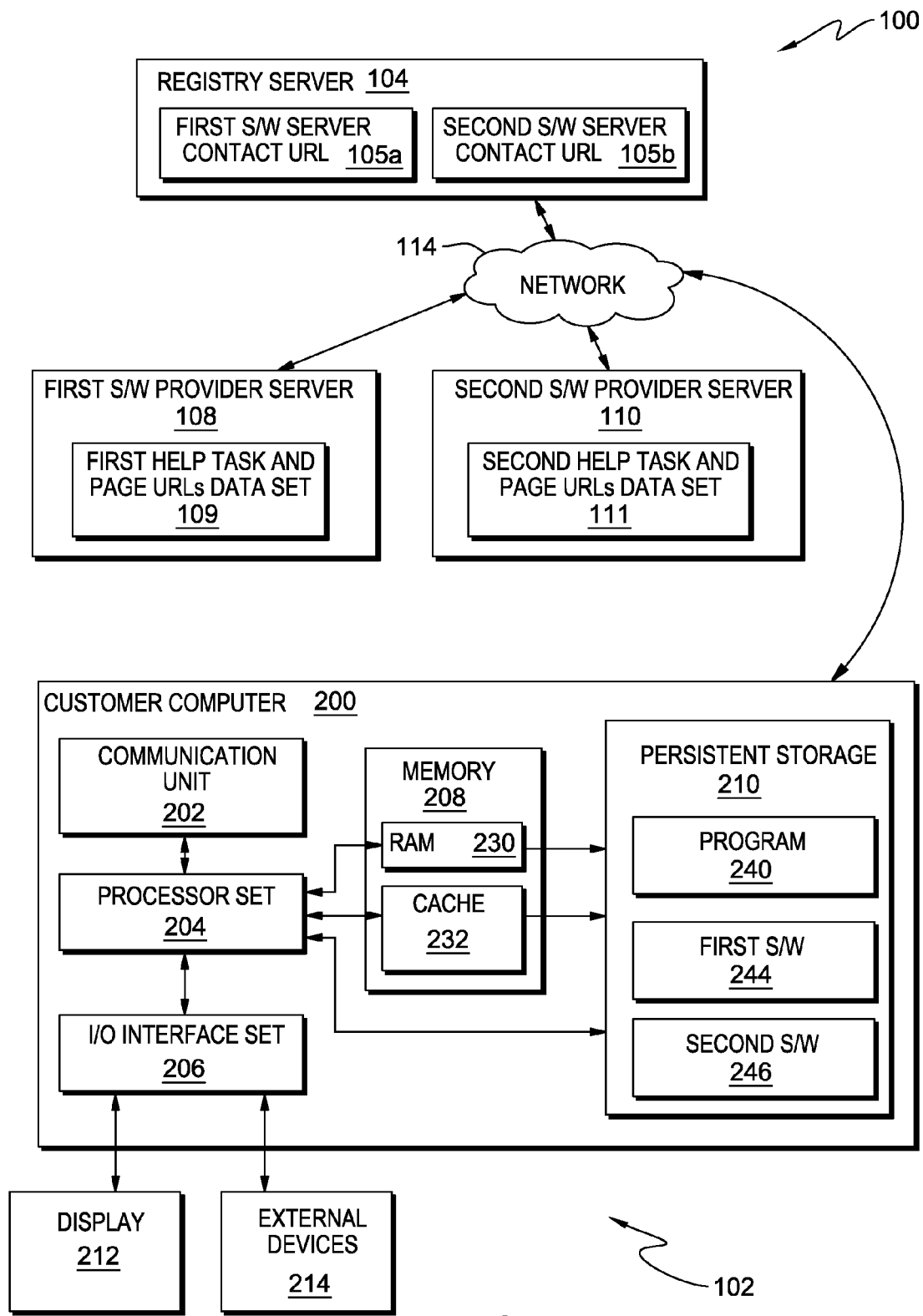
FIG. 1 is a schematic view of a first embodiment of a networked computers system according to the present invention.

This Detailed Description section is divided into the following sub-sections: (i) The Hardware and Software Environment; (ii) First Embodiment; (iii) Further Comments and/or Embodiments; and (iv) Definitions.

I. The Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

An embodiment of a possible hardware and software environment for software and/or methods according to the present invention will now be described in detail with reference to the Figures. FIG. 1 makes up a functional block diagram illustrating various portions of distributed data processing system 100, including: customer computer sub-system 102; registry server computer sub-system 104; first software page and/or task URLs 105a; second software page and/or task URLs 105b; first software provider server computer sub-system 108; first URL addressable task and page codes 109; second software provider server computer sub-system 110; second URL addressable task and page codes 111; communication network 114; customer computer 200; communication unit 202; processor set 204; input/output (i/o) unit 206; memory device 208; persistent storage device 210; display device 212; external device set 214; random access memory (RAM) devices 230; cache memory device 232; program 240; first software 244; and second software 246.

As shown in FIG. 1, customer computer sub-system 102 is, in many respects, representative of the various computer sub-system(s) in the present invention. Accordingly, several portions of computer sub-system 102 will now be discussed in the following paragraphs.

Customer computer sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 240 is a collection of machine readable instructions and/or data that is used to create, manage and control certain software functions that will be discussed in detail, below, in the First Embodiment(s) sub-section of this Detailed Description section.

Customer computer sub-system 102 is capable of communicating with other computer sub-systems via network 114 (see FIG. 1). Network 114 can be, for example, a local area network (LAN), a wide area network (WAN) such as the Internet, or a combination of the two, and can include wired, wireless, or fiber optic connections. In general, network 114 can be any combination of connections and protocols that will support communications between customer and server sub-systems.

It should be appreciated that FIG. 1 provides only an illustration of one implementation (that is, system 100) and does not imply any limitations with regard to the environments in which different embodiments may be implemented. Many modifications to the depicted environment may be made, especially with respect to current and anticipated future advances in cloud computing, distributed computing, smaller computing devices, network communications and the like.

As shown in FIG. 1, customer computer sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 240 is stored in persistent storage 210 for access and/or execution by one or more of the respective computer processors 204, usually through one or more memories of memory 208. Persistent storage 210: (i) is at least more persistent than a signal in transit; (ii) stores the device on a tangible medium (such as magnetic or optical domains); and (iii) is substantially less persistent than permanent storage. Alternatively, data storage may be more persistent and/or permanent than the type of storage provided by persistent storage 210.

Program 240 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface(s) 206 allows for input and output of data with other devices that may be connected locally in data communication with customer computer 200. For example, I/O interface 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 240, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. First Embodiment

Preliminary note: The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
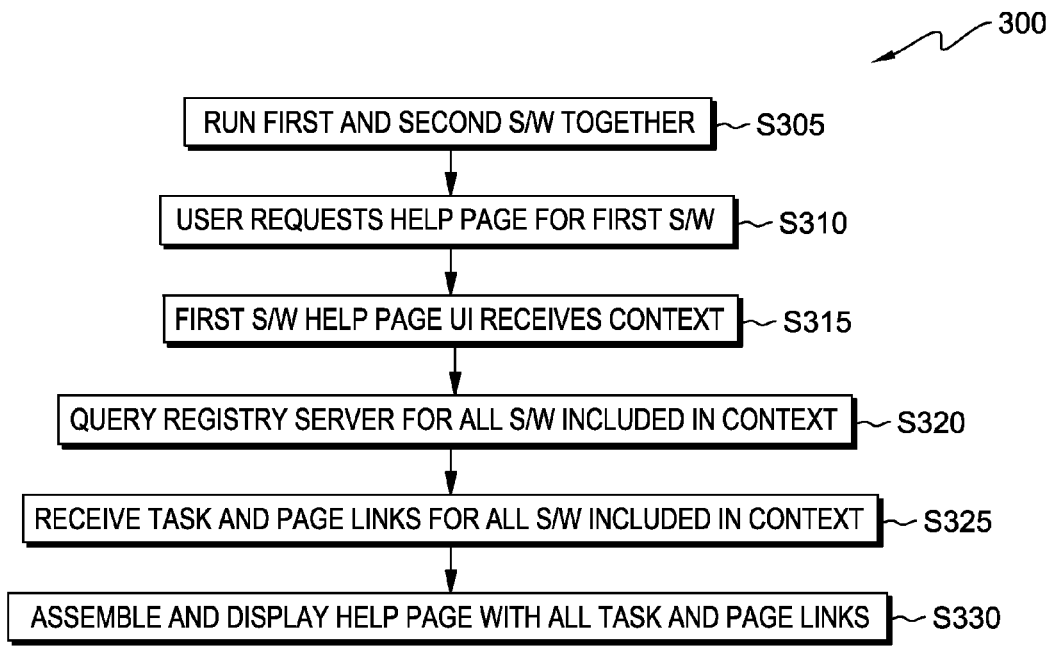
FIG. 2 is a flowchart showing a process performed, at least in part, by the first embodiment computer system.
Figure 3:
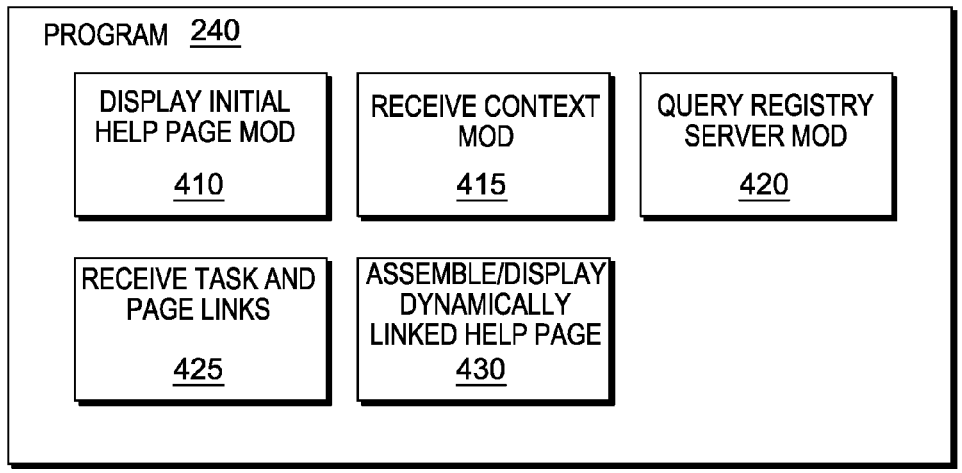
FIG. 3 is a schematic view of a portion of the first embodiment computer system.

FIG. 2 shows a flow chart 300 depicting a method according to the present invention. FIG. 3 shows program 240 for performing at least some of the method steps of flow chart 300. This method and associated software will now be discussed, over the course of the following paragraphs, with extensive reference to FIG. 2 (for the method step blocks) and FIG. 3 (for the software blocks).

Processing begins at step S305, where customer computer 200 runs interdependent software 244, 246 together, locally on customer computer 200 (see FIG. 1). Alternatively, one or both software could be run in a distributed manner. Alternatively, there could be more than two software products running. Because software 244 and 246 respectively come from two different software providers, customer computer 200 is running a "heterogeneous" software configuration when it runs both software 244 and software 246.

Figure 4A:
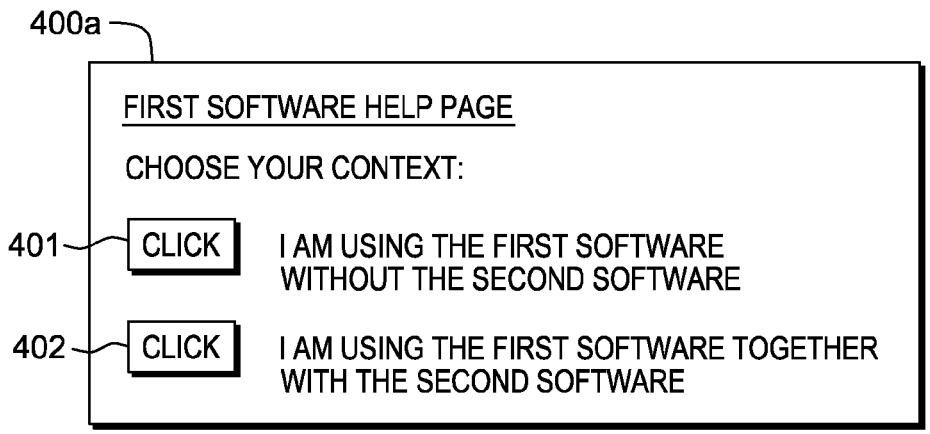
FIG. 4A is a first screenshot generated by the first embodiment computer system.

Processing proceeds to step S310, where a customer (not shown) at customer computer sub-system 102 (see FIG. 1) requests a help page related to the first software. In this example, the help page is requested because the user is having a problem, which the user perceives as relating to first software 244. Further at step S310, and in response to the customer's help request, display initial help page module ("mod") 410 of program 240 of customer computer 200 displays an initial help page for the first software, as shown in screenshot 400a of FIG. 4A.

Processing proceeds to step S315, where receive context mod 415 receives "context" information through the user interface (UI) provided by the first software initial help page 400a. More specifically, in this simple example, screenshot 400a asks the user to choose between clickable "button" 401 (running first software without the second software) and clickable "button" 402 (running first and second software together). In this example, the customer chooses clickable button 402, to select the context, because the customer knows that her system is running the first and second software together. Alternatively, the step S315 determination of context could be performed automatically by software and without the need for active customer intervention to choose the context.

Processing proceeds to step S320, where query registry server mod 420 of program 240 of customer computer sub-system 102 queries, through network 114, registry server 104 (see FIG. 1) for all page and task links for all software included in the context, as previously determined at step S315. In this example, this means that the query asks for all page and task links relating to both of: (i) first software 244; and (ii) second software 246. It is helpful to have the correct context of the heterogeneous software configuration so that all of the relevant page and/or task links will be requested in the query. It is noted that registry server 104 may be maintained and run by: (i) the provider entity for first software 244; (ii) the provider entity for second software 246; (iii) the provider entities for the first and second software, working co-operatively; or (iv) a third party.

Processing proceeds to step S325, where receive task and page links mod 425 receives, through network 114, all task and page links from both of: (i) first software server contact URL data set 105a of registry server computer sub-system 104; and (ii) second software server contact URL data set 105b of registry server computer sub-system 104 (see FIG. 1). Both data sets 105a (corresponding to first software 244) and data set 105b (corresponding to second software 246) are consulted because the software configuration context, as previously determined at step S315, includes both first software 244 and second software 246. In this simplified example, the registry has the contact information for only two software providers. Alternatively, in some embodiments, the registry will have contact URLs for a great number of software providers and/or software products. As a further alternative, the contact information could be in the form of an Internet Protocol (IP) address. The contact information for a software provider's help server(s) will herein generically be referred to as "network address information."

Figure 4B:
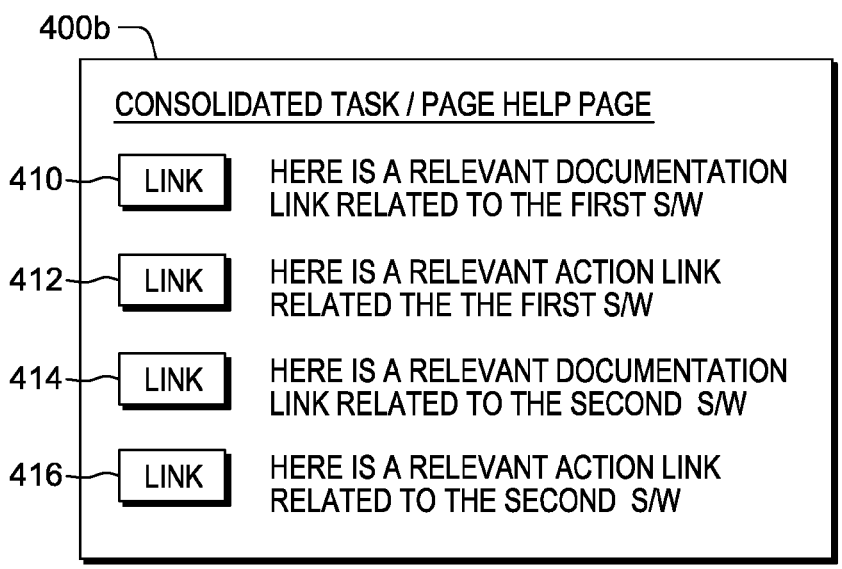
FIG. 4B is a second screenshot generated by the first embodiment computer system.

Processing proceeds to step S330, where assemble and display dynamically linked help page mod 430 assembles and displays a dynamically linked help page, as shown by screenshot 400b of FIG. 4B. More specifically, the software provider contact URLs, received previously at step S325, are used by mod 430 to directly contact servers maintained by the first and second software providing entities included in the context of the heterogeneous configuration of the customer computer. When the first software provider server 108 (see FIG. 1) is thusly contacted, first help task and page URLs data set 109 sends help task and help page URLs to mod 430 for assembly into a dynamically linked help page. Likewise, when the second software provider server 110 (see FIG. 1) is thusly contacted, second help task and page URLs data set 111 sends help task and help page URLs to mod 430 for assembly into the same dynamically linked help page. The links are considered to be dynamic because the servers of the software provider entities are consulted for the links on each occasion that the dynamically linked help page is built. This way, if a software provider entity changes its URLs for help tasks or help pages, then the dynamically linked help page will have the most up-to-date information. As with the contact URLs, other network addressing identifiers could be used in place of URLs for the help and task pages—generically, again, these will herein be referred to as "network address information."

Turning to screenshot 400b of FIG. 4B, which is displayed on display 212 (see FIG. 1) at step S330: (i) clickable "button" 410 links to a help page for the first software; (ii) clickable "button" 412 links to a help task for the first software; (iii) clickable "button" 414 links to a help page for the second software; and (iv) clickable "button" 416 links to a help page for the first software. Because the dynamic links relate to more than one separate and distinct software provider's resources, this help page of screenshot 400b is "heterogeneous."

III. Further Comments and/or Embodiments

The present invention recognizes the following potential problems (which may or may not have been previously recognized as potential problems) in the areas of conventional software documentation and/or conventional help pages: (i) maintenance and administration steps in product life cycle are critical for product operations, but unfortunately most of these steps are documented in huge descriptive data and require interaction with multiple documents of single or more than one product; (ii) all the configuration steps available in the documents make it difficult to identify the correct set of steps and can be a real problem for customer; (iii) much time is spent on figuring out the correct documentation and then extracting the steps from that data; (iv) for a large scale or distributed systems, users need to login to multiple servers to perform steps mentioned in the info center; (v) manual processes for obtaining documentation and/or help leads to frequent errors; (vi) help/documentation system doesn't target the entirety of the product because help is specific to windows dialogues (that is, the help/documentation doesn't provide for a non-heterogeneous help system); (vii) some conventional help/documentation systems don't work in a distributed environment where multiple products are installed to interact with each other; (viii) not dynamic; (ix) information available in conventional software product documentation is generally not programmatically determined; (x) many of the customer reported problems are due to lack of assistance available or ambiguous information present in an "info center"; and (xi) many of the PMRs (problem management requests) are informational PMRs asking about a particular documentation link to perform steps.

The present invention further recognizes the following further potential problems (which may or may not have been previously recognized as potential problems) in the areas of conventional software documentation and/or conventional help pages: (i) if a customer is following steps from product documentation for an integration scenario or distributed systems involving multiple products then this tends to be an especially error prone process; (ii) identifying appropriate software problem solution actions steps, especially when multiple software products each with its own huge respective documentation, is not an easy job; (iii) some conventional help systems are local to action pages associated exclusively with software made by a single software manufacturer (this type of help system is herein described as "non-heterogeneous"); (iv) non-heterogeneous help systems do not address problems for heterogeneous systems; and (v) at least some conventional help systems do not provide customized action pages along with dynamic scenario.

Some embodiments of the present invention may have one, or more, of the following characteristics, features and/or advantages: (i) helping a customer by taking additional overhead of going through large documents relating to various software in heterogeneous systems; (ii) help systems designed for "heterogeneous computer systems" where a single end user is simultaneously dealing with multiple pieces of software provided from multiple software manufacturers; (iii) help systems designed for "heterogeneous interdependent computer systems" where a single end user is simultaneously dealing with multiple pieces of interdependent software provided from multiple software manufacturers; (iv) providing a single UI (user interface) or consolidated script for a software problem in a heterogeneous computer system (herein called a "heterogeneous UI/script"); (v) providing a heterogeneous UI/script in response to a customer PMR; (vi) linking the action page (product/customize)/identified resource URLs (uniform resource locator) with product documentation; (vii) providing a new edge of creating the documentation; (viii) solving additional overhead of extracting useful information from huge data; (ix) software products register their pages, action or URL addressable resources to a centralized registry that includes multiple separate and distinct software manufacturers; (x) help system based upon a programmatic API (application programming interface), such as REST (representational state transfer); and/or (xi) use of an API that allows authenticated users to query the registered URL addressable resources, pages and/or actions from the registry (if a registry is available) or from the product directly.

Some embodiments of the present invention may have one, or more, of the following characteristics, features and/or advantages: (i) retrieved and matched URL(s) can be linked to web pages which are relevant to a retrieved resource; (ii) UI with resource UI/delegated dialogue may take additional information from user required for invoking action page/delegated dialogue/product task window; (iii) a task may be a single script or multiple scripts encapsulating the execution flow defined in the product documentation and this task is exposed over a REST call; (iv) reduced need for customer to login to different servers when getting help; and/or (v) to inform the user that there is an action page/resource URL available in the server, a different action icon (image) can be appended with product document pages.

In some embodiments, instead of performing additional logins before getting problem-response steps to take (or have taken automatically), the customer can instead simply click on the action icon at a heterogeneous system help page to effect the receiving of the help (for example, a list of steps to take, automatic actions by help software, etc.). For example, help documents may be hosted on a centralized registry to provide a heterogeneous help system that is easy to use because the centralized registry aggregates information from multiple different software manufacturers. The following method is then performed: (i) the help files are loaded; (ii) identify registered resource URLs and link the URL with correct set of documents; (iii) change the documentation pages by providing task execution icons (verify or configuration image icons) and hyper link the found URLs with icon; (iv) customer clicks on the appropriate image icon; (v) the action page or task interactive window opens in same frame (or in a different tab depending on system design and/or customer selected preference); (v) customer provides additional information to authenticate, providing additional parameters and run the action from product document itself; and (vi) after completion of action, the help result is communicated to the customer on the same page.

Figure 5:
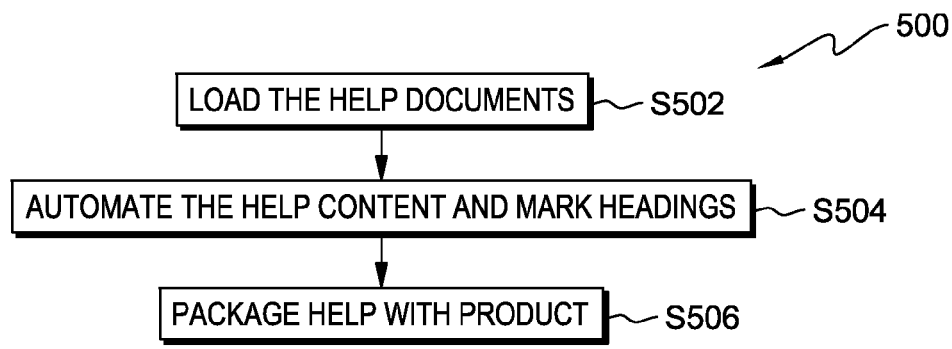
FIG. 5 is a method performed by a second embodiment of a networked computers system according to the present invention.

System flow will now be described with reference to flowchart 500 of FIG. 5, which shows process flow between and among process steps S502, S504 and S506. Flowchart 500 shows help development time activities. In steps S504 and S506, annotations are used to identify configuration or other files, and these annotations uniquely identify the file(s) using a product name, system architecture and/or other identifier that is recognizable by the heterogeneous help system.

An example of product documentation is as follows: "Configuring the Netcool/OMNIbus Object Server". An example of an HTML (hypertext markup language) annotated snippet corresponding to this product documentation is as follows: "<h2 task="omni_objectserver_config" type="configuration" product_id="Omnibus">Configuring the Netcool/OMNIbus Object Server</h2>". In these examples, page heading is identified by page type and product ID as an identifier.

Figure 6:
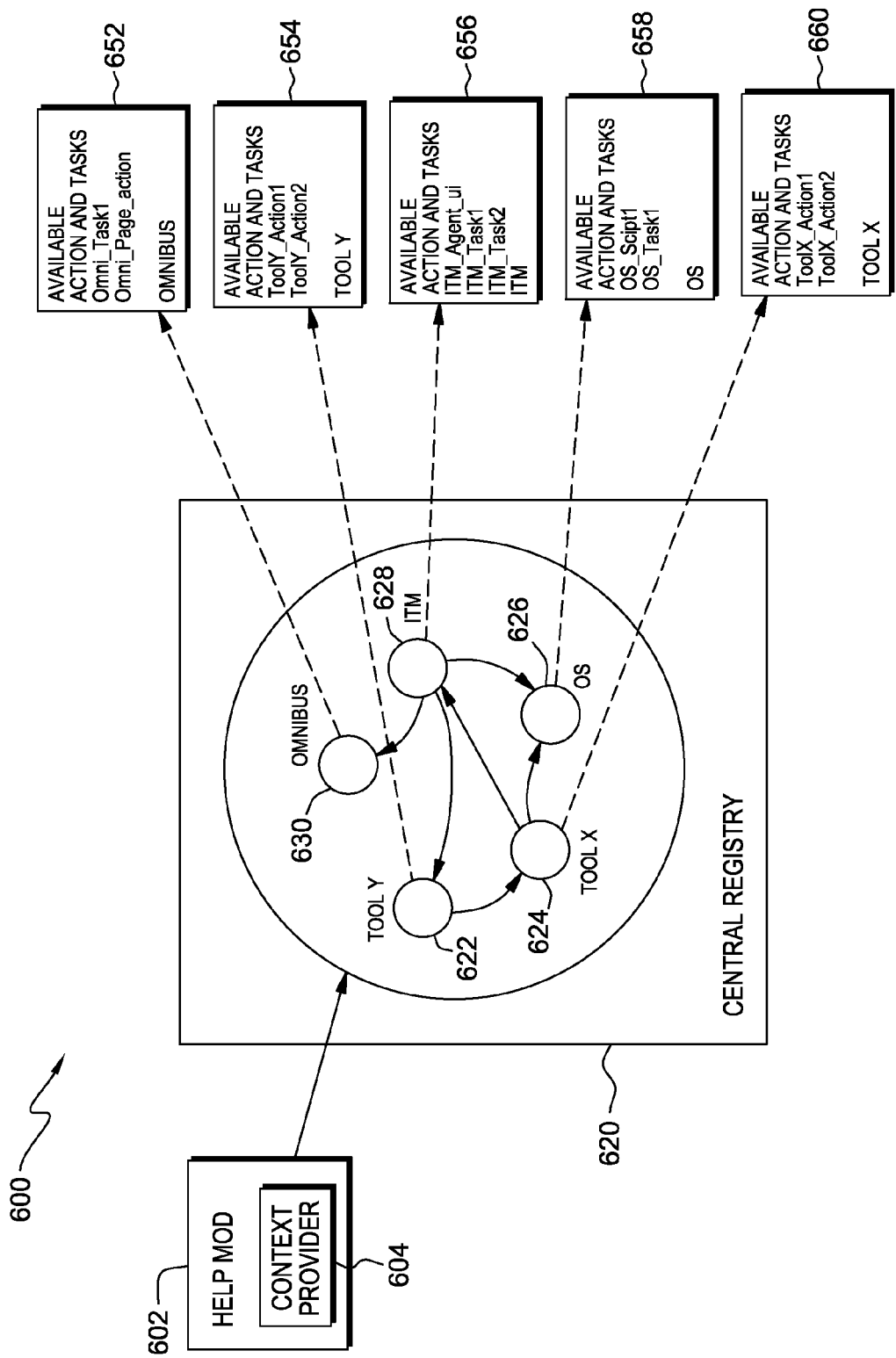
FIG. 6 is a schematic view of the second embodiment networked computers system.

As shown in FIG. 6, heterogeneous help system 600 includes: help module ("mod") 602; context provider 604; central registry 620; tool Y block 622; tool X block 624; OS block 626; monitor block (also called ITM block) 628; omnibus block 630; and link blocks 652, 654, 656, 658, 660. In operation: (i) the central registry determines and identifies dependencies and relationships between the various heterogeneous products running on the customer's computer system (not shown in FIG. 6) and represented in FIG. 6 by blocks 622, 624, 626, 628 and 630; (ii) link blocks 652, 654, 656, 658 and 660 are provided to the customer as help; and (iii) link blocks 652, 654, 656, 658 and 660 expose the configuration.

An example of system flow is as follows: (i) products/applications (herein sometimes collectively referred to as software products) register themselves and their relationships with a central registry to advertise their service and customized actions; (ii) a customer opens help mod 602 (see FIG. 6) documentation to search for assistance in administration, configuration or the like; (iii) context provider 604 (see FIG. 6) identifies the help files requested by the customer; (iv) context provider 604 of help mod 602 (see FIG. 6) then queries the product information and available task services (that is, link blocks 652, 654, 656, 658, 660) from central registry 620; (v) context provider 604 contacts each product service directly (by using link blocks 652, 654, 656, 658, 660 received from central registry 620) to retrieve the information necessary to build the resource addressable URLs and traverse the links (of link blocks 652, 654, 656, 658, 660) to providers and identifies pages; (vi) context provider 604 formats help module 602 with an embedded links task action/page action URL; (vii) the help with embedded links will be displayed to the user; and (viii) help mod 602 provides context specific information as per product instance.

In step (ii) of the example system flow set forth above, the customer just has to open his help page or search for a particular help for a product. The help pages are annotated with some additional metadata (that is, product, page id, etc.). Now using this information, the context provider queries the central registry to find the products using the product id and then queries the product for the page it wants to link to and when it is found it just embeds the link into the help page. Now in some embodiments, the help could be heterogeneous systems and aggregated through different means. In other embodiments, the help could be displayed in context in the product (that is, when the customer is operating the product he might click on help which will launch a dialog which shows the help and in this scenario the system can use the context of the product from which the help was launched to customize further to use this information to query the registry and product provider for the action pages to link to).

In step (iii) of the example system flow set forth above, there will be multiple help files or there could be just one, depending upon the system design. The help file, as mentioned earlier, will carry annotations that specify the product and the page id's and locations where the links need to be made available on the page (for example, simple anchor tags). This info is actually used to find the task/action pages by the context provider.

In step (iv) of the example system flow set forth above, link blocks 652, 654, 656, 658, 660 each include one or more URLs (URLs not shown in FIG. 6). In this embodiment there is no substantive help and/or documentation data into the registry, but, rather just links (URLs) to where the data can be found. Traversing the link (see step (v) of the example system flow set forth above) provides the data that the customer is really looking for. For this reason, the registry is really a "shallow copy" (that is, the centralized registry does not contain substantive data). The following is an example of what data is actually stored in the centralized registry (it is just a pedagogical example to show what is meant and it might not be syntactically correct):
<Resource about="Omnibus">
<hasActions resource="http://9.182.13.13:8080/0mnibus/tasks"/>
<dependsOn resource="http://9.182.100.100:8080/ToolY"/>
</Resource>

Here, the "dependsOn" is just a link to another resource ToolY and the software can traverse to ToolY resource to find more info about it. Here "has Actions" is a link to the product provider and traversing the link would provide me with a list of actions. Again a pedagogical example of this:
<Resource about="Omnibus">
<action id="id1" resource="http://9.182.13.13:8080/0mnibus/tasks/page1"/>
<action id="id2" resource="http://9.182.13.13:8080/0mnibus/tasks/page2"/>
<action id="id3" resource="http://9.182.13.13:8080/0mnibus/tasks/page3"/>
<action id="id4" resource="http://9.182.13.13:8080/0mnibus/tasks/page4"/>
</Resource>

Above, each action could be an action page and the "id" would be something that is found in the help page as an annotation. So, the context provider when looking at the Omnibus help pages would first query the registry for "Omnibus" and finds the first resource (1), and then it would in turn traverse the link that says has Actions to find the action it is looking for based on the annotation in the help (that is, id1 or id 2 and so on).

In the step (vi) of the example system flow set forth above, context provider 604 also performs the following actions: (a) form the URLs to be addressable to resources and task action/page actions; (b) find matches for page and action URLs based on URL metadata and page identifiers; and (c) appends image icons hyperlinked with action URLs.

In step (vii) of the example system flow set forth above, if the user wants to launch a page action or run a task action then the following steps are performed: (a) provide linked data delegated dialogue to the users to run that action; and (b) do a linked call to store task/action status.

In step (viii) of the example system flow set forth above, different available instances and their respective results are displayed to the customer, at least when multiple instances of a product are available to allow the customer the option to perform an action or access a page from a particular instance of the product.

Some embodiments of the present disclosure may have one, or more, of the following advantages: (i) time to value as there is very little time required to accomplish a scenario, one click and the task will be executed; (ii) product documentation will no longer be isolated from the environment and will be applicable for heterogeneous environment; (iii) a fresh, new approach of writing help documents, which is more programmatically determined for information extraction; and/or (iv) tasks are exposed with URLs meaning that any new task or entry in an info center can easily be linked to cover a new scenario.

Some embodiments of the present disclosure may have one, or more, of the following characteristics, advantages and/or features: (i) a method to execute actions or link tasks/pages to help pages dynamically using linked data; (ii) a method to dynamically relate help pages with actions/other pages; (iii) a method to create a context from a help page which can be used to query for other resources; (iv) a method to locate resources to a help page using in context; (v) a method to place linked resources into a help page; a method to annotate a page to indicate a context which may be used to query for resources to link to; (vi) a method to enrich a help page with retrieved linked resources; and/or (vii) a method to execute linked actions from a help page.

Some embodiments of the present disclosure may have one, or more, of the following characteristics, advantages and/or features: (i) do not run tools to create menus, but, rather, use linked data to discover products and their dependencies through a central registry; (ii) use discovered linked information to find tasks or pages from the products that are to be linked to the help; (iii) customer help that works across different software and/or different software manufacturers; (iv) provides help and/or documentation solutions that include consideration of multiple software products; (iv) provides help and/or documentation solutions for a distributed setup; (v) product context is used for enriching help; (vi) does not merely fetch information on how to complete tasks, but, rather, drives the task action itself; (vii) goes beyond a system to aggregate help documents in order to provide a system that isolates links (and only links) from various software manufacturers to build a help page with useful links from heterogeneous with extraneous HTML, or other data, from the various software providers; and (viii) uses context from the underlying program to achieve improved customers software help and/or documentation. With respect to item (viii in the preceding list, the underlying program could be, for example, "Omnibus" which may potentially implicate multiple programs, such as Omnibus, Tool X, Tool Y and their respective dependencies, etc. All of these software manufacturers are queried based on the annotations in the help HTML files. For example, an example annotation states, "if Omnibus depends on Tool Y then embed page Z into the help, else embed Page Q."

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: non-exclusive or; for example, A and/or B means that: (i) A is true and B is false; or (ii) A is false and B is true; or (iii) A and B are both true.

User/customer: includes, but is not necessarily limited to, the following: (i) a single individual human; (ii) an artificial intelligence entity with sufficient intelligence to act as a user or customer; and/or (iii) a group of related users or customers.

Software storage device: any device (or set of devices) capable of storing computer code in a non-transient manner in one or more tangible storage medium(s); "software storage device" does not include any device that stores computer code only as a signal.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

What is claimed is:

1. A method comprising:
    concurrently running, on a customer computer, a plurality of software products including a first software product and at least one contextual software product, wherein the first software product and the at least one contextual software product are not provided by the same software provider;
    receiving, by the customer computer, user input indicating a request for information relating to the first software product;
    responsive to the receipt of the request, querying, by the customer computer, through a communication network and from a central registry, to request product information relating to each of the software products of the plurality of software products, wherein the central registry indicates dependencies between each of the software products of the plurality of products;
    receiving, by the customer computer, through the communication network and from the central registry: (i) product information for the plurality of software products; (ii) the identities of task services available through the central registry for the plurality of software products; and (iii) the dependencies between each of the software products of the plurality of products;
    directly contacting, by the customer computer and through the communication network, product service for each software product of the plurality of software products to retrieve information necessary to a build a set of resource addressable link(s) for each software product of the plurality of software products;
    traversing the set of resource addressable link(s) respectively corresponding to each software product, by collecting information from the resources addressed by the set of resource addressable link(s), to identify a set of page(s) respectively associated with each software product of the plurality of software products, wherein the dependencies between each of the software products of the plurality of products are used in identifying the set of page(s);
    dynamically identifying a set of task action/page action uniform resource locator (URL) address(es) for each software product of the plurality of software products, wherein the set of task action/page action uniform resource locator (URL) address(es) are dynamically identified on each occasion that a help page is assembled and displayed based on the information collected by consulting the product service for each software product of the plurality of software products; and
    assembling and displaying a help page that includes all task action/page URL addresses for the plurality of software products.

2. The method of claim 1 wherein the identification of the set of task action/page action uniform resource locator (URL) address(es) for each software product of the plurality of software products is further based on matching pages and action URLs based on URL metadata and page identifiers.

3. The method of claim 1 wherein assembly and display of the help page includes appending image icons hyperlinked with the set of task action/page action uniform resource locator (URL) address(es) for each software product of the plurality of software products.

* * * * *